(12) United States Patent
Lokhandwala

(10) Patent No.: US 8,906,143 B2
(45) Date of Patent: Dec. 9, 2014

(54) MEMBRANE SEPARATION APPARATUS FOR FUEL GAS CONDITIONING

(75) Inventor: Kaaeid A. Lokhandwala, Fremont, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 215 days.

(21) Appl. No.: 13/224,891

(22) Filed: Sep. 2, 2011

(65) Prior Publication Data
US 2013/0055897 A1  Mar. 7, 2013

(51) Int. Cl.
*B01D 53/22* (2006.01)
*B01D 46/00* (2006.01)
*B01D 46/24* (2006.01)
*B01D 63/10* (2006.01)
*B01D 50/00* (2006.01)
B01D 65/02 (2006.01)
C10L 3/10 (2006.01)

(52) U.S. Cl.
CPC ...... B01D 46/0004 (2013.01); *B01D 2257/108* (2013.01); *B01D 2256/245* (2013.01); *B01D 2257/504* (2013.01); B01D 53/22 (2013.01); B01D 46/003 (2013.01); *B01D 65/025* (2013.01); *Y02C 10/10* (2013.01); *B01D 2257/7022* (2013.01); *B01D 2311/04* (2013.01); *C10L 3/101* (2013.01); B01D 46/24 (2013.01); *B01D 2313/20* (2013.01); B01D 46/0019 (2013.01); B01D 53/229 (2013.01); B01D 63/10 (2013.01); *B01D 2257/80* (2013.01); B01D 50/00 (2013.01); *B01D 2257/304* (2013.01); *B01D 2313/90* (2013.01)

USPC .......... 96/4; 55/342; 55/385.1; 95/46; 95/50; 96/7; 96/9

(58) Field of Classification Search
CPC ....... B01D 53/22; B01D 53/228; B01D 63/08
USPC ............... 55/342, 385.1; 95/46, 50; 96/4, 7, 9
See application file for complete search history.

(56) References Cited

U.S. PATENT DOCUMENTS

| | | | | |
|---|---|---|---|---|
| 3,407,719 A | * | 10/1968 | Temple et al. | 454/49 |
| 4,211,541 A | * | 7/1980 | Fernandez | 95/92 |
| 4,857,078 A | | 8/1989 | Watler | |
| 4,962,270 A | * | 10/1990 | Feimer et al. | 585/819 |
| 4,963,165 A | | 10/1990 | Blume et al. | |
| 5,089,033 A | | 2/1992 | Wijmans | |
| 5,199,962 A | | 4/1993 | Wijmans | |

(Continued)

FOREIGN PATENT DOCUMENTS

JP   5137922 A   1/1993

OTHER PUBLICATIONS

Zeus "Low Temperature Properties of Polymers" pp. 1-6 http://www.zeusinc.com/UserFiles/zeusinc/Documents/Zeus_Low_Temp.pdf 2005.*

*Primary Examiner* — Jason M Greene
*Assistant Examiner* — Anthony Shumate
(74) *Attorney, Agent, or Firm* — K. Bean; T. Hott

(57) ABSTRACT

Disclosed herein is a membrane separation apparatus that includes an integrated filter element and a membrane element housed within a single vessel. The vessel is configured to allow liquids to be trapped and removed from the vessel, and gases to flow to and through the membrane element. The apparatus is useful in the conditioning of fuel gas to separate methane from $C_{2+}$ hydrocarbons.

20 Claims, 8 Drawing Sheets

(56) References Cited

U.S. PATENT DOCUMENTS

| | | | |
|---|---|---|---|
| 5,205,843 A | 4/1993 | Kaschemekat et al. | |
| 5,374,300 A | 12/1994 | Kaschemekat et al. | |
| 5,501,722 A | 3/1996 | Toy et al. | |
| 5,800,597 A | 9/1998 | Perrotta et al. | |
| 6,053,965 A | 4/2000 | Lokhandwala | |
| 6,132,693 A * | 10/2000 | Gruenwald et al. | 423/235 |
| 6,281,255 B1 | 8/2001 | Kunin et al. | |
| 7,429,287 B2 * | 9/2008 | Frantz | 95/49 |
| 7,497,896 B2 * | 3/2009 | Bromet et al. | 95/50 |
| 7,537,641 B2 * | 5/2009 | Lokhandwala et al. | 95/45 |
| 7,621,982 B2 * | 11/2009 | Kang et al. | 96/4 |
| 7,731,784 B2 * | 6/2010 | Wright et al. | 96/4 |
| 7,758,670 B2 * | 7/2010 | Wynn et al. | 95/45 |
| 7,833,307 B2 * | 11/2010 | Wright et al. | 55/482 |
| 7,976,598 B2 * | 7/2011 | Matula et al. | 55/344 |
| 8,231,699 B2 * | 7/2012 | Wright et al. | 55/423 |
| 2010/0239373 A1 * | 9/2010 | Gillecriosd | 405/128.5 |
| 2011/0183390 A1 * | 7/2011 | Hickey et al. | 435/140 |

* cited by examiner

MEMBRANE SEPARATION APPARATUS FOR FUEL GAS CONDITIONING

FIELD OF THE INVENTION

The invention relates to a membrane separation apparatus which includes an integrated filter element. The apparatus is useful in the conditioning of fuel gas to separate methane from $C_{2+}$ hydrocarbons.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide, or water vapor. On the other hand, streams that contain relatively large proportions of heavier hydrocarbons and/or other contaminants are common. Before the raw gas can be sent to the supply pipeline, it must usually be treated to remove at least one of these contaminants.

As it travels from the wellhead to the processing plant and, ultimately, to the supply pipeline, gas may pass through compressors or other field equipment. These units require power, and it is desirable to run them using gas engines fired by natural gas from the field. Since the gas has not yet been brought to specification, however, this practice may expose the engine to fuel that is of overly high Btu value, low methane number, or is corrosive.

In the gas processing plant itself, heavy hydrocarbons are often removed by condensation. Such a method is impractical in the field, however, because sources of external cooling or refrigeration are not available. Furthermore, cooling of the raw gas, which still contains substantial quantities of water vapor, is likely to bring the gas to a pressure/temperature/composition condition under which hydrates can begin to crystallize, thereby clogging the condensation equipment and preventing gas flow.

That membranes can separate $C_{3+}$ hydrocarbons from gas mixtures, such as natural gas, is known, for example, from U.S. Pat. Nos. 4,857,078; 5,281,255; 5,501,722; and 6,053,965. Separation of acid gases from other gases is taught, for example, in U.S. Pat. No. 4,963,165. It has also been recognized that condensation and membrane separation may be combined, as is shown in U.S. Pat. Nos. 5,089,033; 5,199,962; 5,205,843; and 5,374,300.

Conventional membrane skids for use in fuel gas conditioning include at least two separate components: a filter element and one or more membrane vessels. Besides the separate vessels for the filters and membrane elements, the skid carries piping, valves, and other components needed to connect the filter and membrane vessels, as well as pipework and instrumentation to enable the filter/membrane skid to be tied in to the compressor skid or other equipment at the site. The costs for the piping and skid can be substantial, and the interconnecting piping may need to be insulated, heat-traced, and comply with specifications and codes to be used in the field. In addition, the skid itself requires longer to fabricate if piping is involved.

The traditional skidded approach described above is appropriate for larger fuel gas conditioning units (FGCUs) having relatively large numbers of membrane elements housed in multiple vessels. For smaller fuel gas conditioning applications that require only one or a few elements that can be housed in one membrane vessel, the relative costs of the pipework and frame become disproportionately high, and the time and complexity of installation discourage potential users due to price. There remains a need for simpler, more cost-effective equipment, especially where the gas to be conditioned has a relatively small flow rate.

SUMMARY OF THE INVENTION

The invention is a fuel gas conditioning unit or apparatus that comprises a filter and one or more selective separation elements or modules, all housed within a single vessel. The vessel may optionally be mounted directly on the compressor frame, without the need for its own supporting frame, thereby reducing complexity, costs, and set-up time.

The vessel of the present invention typically has four nozzles through which the gas to be conditioned can enter, the liquids collected by the filter can be drained, and the treated gas can exit as separate residue and permeate streams. These nozzles may be connected directly to the gas and fuel lines as appropriate, greatly reducing the need for interconnecting pipework, valves, gauges, and the like, and the concomitant costs.

Accordingly, disclosed herein is a gas separation apparatus comprising:
  a vessel housing at least the following components:
    (i) a filter element,
    (ii) a selective separation element having a feed side and a permeate side,
  wherein the vessel includes:
    (i) a feed inlet in fluid communication with the filter element,
    (ii) at least one liquid outlet,
    (iii) means for allowing access to the filter element,
    (iv) means for extracting a residue stream from the feed side,
    (v) means for extracting a permeate stream from the permeate side,
    (vi) means for allowing access to the selective separation element, and
    (vii) means for directing filtered gas streams to the feed side.

The selective separation element is typically a polymeric membrane, of the type known in the art (which will be discussed in further detail in the Detailed Description), but may alternatively comprise non-polymeric, ceramic, or other type of selective barrier materials exhibiting selectivity for one or more components found in natural gas over other components.

The means for allowing access to the filter element and the selective separation element are typically removable heads or flanges.

The means for extracting the residue stream from the feed side, and for extracting the permeate stream from the permeate side, are typically outlets or valves.

In particular embodiments, such as when spiral-wound elements or modules are used, the apparatus further comprises a permeate pipe in fluid communication with the permeate side of the selective separation element.

The vessel may be adapted to house one or multiple selective separation elements.

In certain embodiments, the apparatus is adapted to be operable in a substantially vertical orientation, such that the vessel has a top end and a bottom end. In one particular embodiment, the filter element is below the selective separation element, and the liquid outlet is proximate to the bottom end of the vessel.

In another vertically configured embodiment, the filter element is above the selective separation element, and the liquid outlet is proximate to the top end of the vessel. In this particular configuration, the apparatus is typically adapted to remove liquids in two stages from a gaseous feed stream (which will be described in further detail in the Detailed Description). In this configuration, a section of the vessel housing the filter element is typically divided into two compartments that are separated from each other by a liquid-impermeable plate.

In other embodiments, the apparatus is adapted to be operable in a substantially horizontal orientation. In one such embodiment, the apparatus may be adapted to remove liquids in two stages from a gaseous feed stream. In this configuration, a section of the vessel housing the filter element is typically divided into two compartments that are separated from each other by a liquid-impermeable plate.

In yet another embodiment, the apparatus is adapted to be operable in an L-shaped configuration. This configuration is particularly beneficial in situations in which there are three or more selective separation elements and, in particular, where height limitations are involved. In certain embodiments, the filter element is the vertical portion of the apparatus, and the selective separation elements are the horizontal portion; in other embodiments, the selective separation elements are the vertical portion of the apparatus, and the filter element is the horizontal portion.

The separation apparatus of the present invention is particularly useful in fuel gas conditioning applications, for separating methane from $C_{2+}$ hydrocarbons. In the case of hydrocarbon separations, the selective separation element(s) is typically a membrane element(s) that contains membranes that preferentially permeate $C_{2+}$ hydrocarbons over methane, or that preferentially permeate methane over $C_{2+}$ hydrocarbons.

Membranes that are preferentially permeable to methane over $C_{2+}$ hydrocarbon will typically include a selective layer that comprises a glassy polymeric material. Membranes that are preferentially permeable to $C_{2+}$ hydrocarbons over methane will typically include a selective layer that comprises a rubbery elastomeric polymer. Preferred membrane materials are discussed in the Detailed Description.

In addition to hydrocarbon separations, the apparatus of the invention is also useful in any application which involves a single membrane vessel and filter, including, without limitation, carbon dioxide, hydrogen, and hydrogen sulfide separations, as well as dehydration applications.

It is to be understood that the above summary and the following detailed description are intended to explain and illustrate the invention without restricting its scope.

DETAILED DESCRIPTION OF THE INVENTION

The invention is a fuel gas conditioning unit that comprises a vessel containing at least one filter element and at least one selective separation element within a single housing. The apparatus of the invention can be used in conjunction with most fuel gas conditioning processes known in the art.

A preferred fuel gas conditioning process is disclosed in U.S. Pat. No. 6,053,965 ("the '965 patent"). The process disclosed in the '965 patent utilizes rubbery polymeric membranes to separate $C_{3+}$ hydrocarbons from methane. A $C_{3+}$-enriched permeate stream is withdrawn. The methane-enriched membrane residue stream may optionally be used as combustion fuel.

A particularly preferred fuel gas conditioning process is disclosed in U.S. patent application Ser. No. 13/182,106 ("the '106 application"), which teaches the use of glassy polymeric membranes to separate methane and $C_{2+}$ hydrocarbons. The permeate stream, which is enriched in methane and depleted in $C_{2+}$ hydrocarbons, is routed as part of a fuel gas stream to a fuel user, which is typically a gas engine or other device used to generate power or drive a compressor, but may alternatively be a generator set or boiler, for example and not by way of limitation. The $C_{2+}$-enriched membrane residue stream is routed back to the process as part of the feed gas stream. The process disclosed in the '106 application essentially reverses the approach taken in the '965 patent by using glassy polymeric membranes that are preferentially permeable to methane over $C_{2+}$ hydrocarbons.

The disclosures of the '965 patent and the '106 application are hereby incorporated by reference in their entireties.

In its most basic form, the invention is a membrane separation apparatus in which the filter element and membrane element(s) are housed within a common vessel, and where internal components of the vessel are configured in such a manner as to allow liquids to be trapped and removed from the vessel, and gases to flow to and through the membrane elements. Various preferred embodiments of the invention are shown in FIGS. 1-6, described below. Each of these figures shows a representative two membrane elements mounted within the vessel. It will be apparent to those of skill in the art that more or fewer membrane elements may be included in the series to provide more or less gas processing, as required.

Figure 1A:
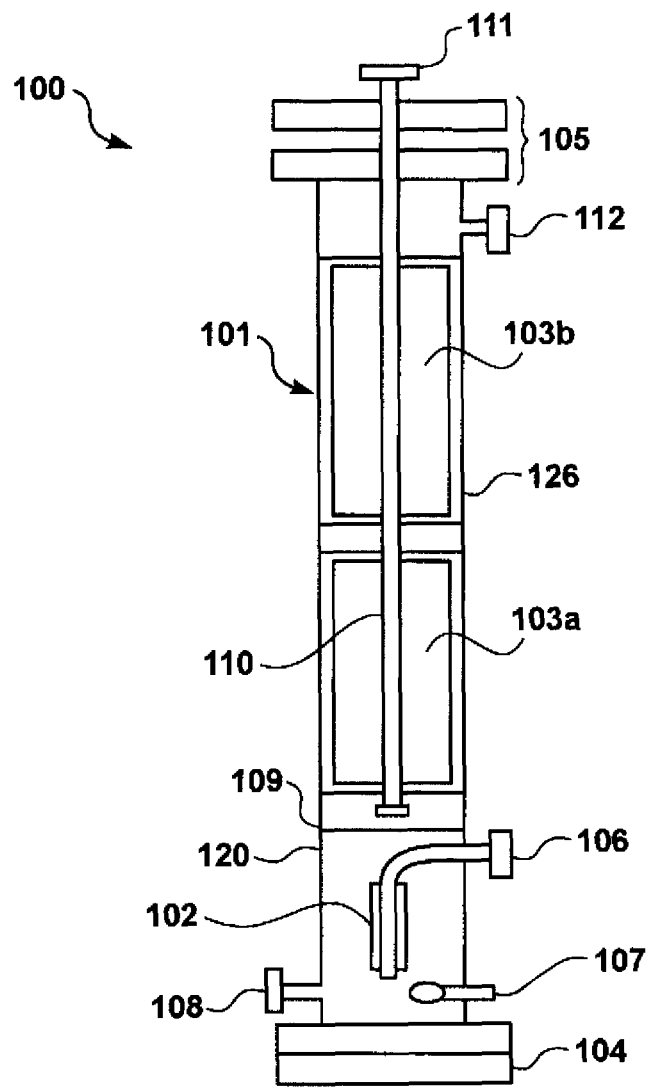
FIG. 1A is a cross-sectional view of a vertically oriented, single-stage filter/membrane separation apparatus in accordance with the invention.
Figure 1B:
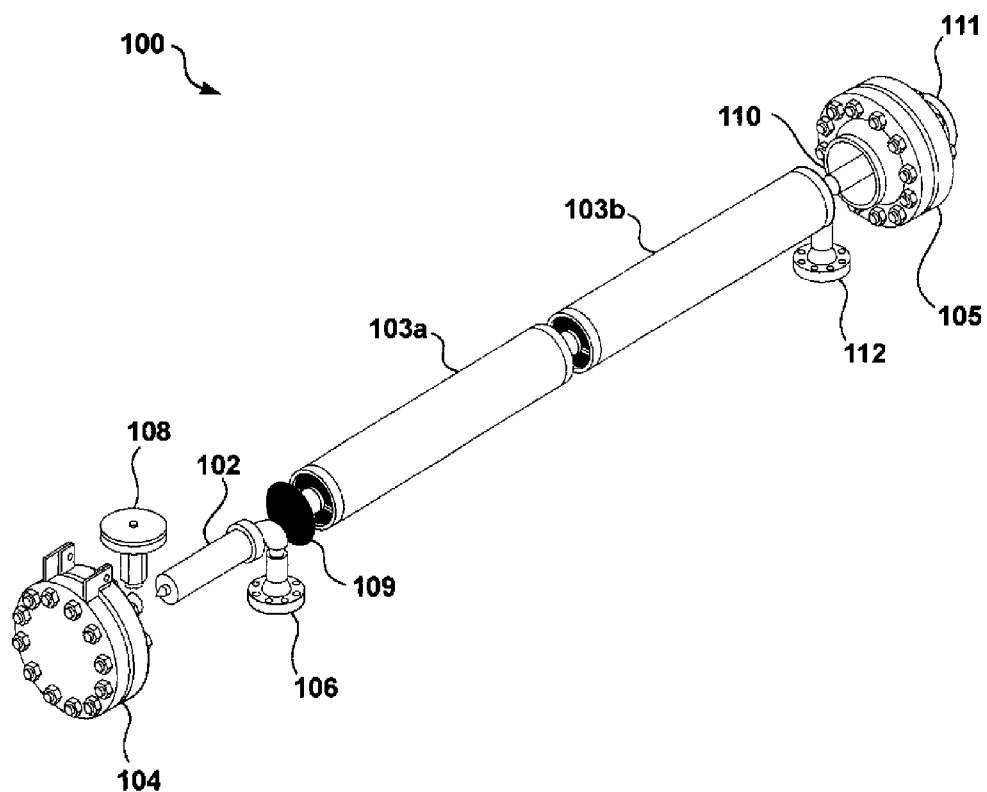
FIG. 1B is an exploded side view of the apparatus shown in FIG. 1A.

FIG. 1A is a cross-sectional view of a basic embodiment of an apparatus, 100, in accordance with the invention. FIG. 1B is an exploded side view of the apparatus 100 shown in FIG. 1A. This basic embodiment illustrated in FIGS. 1A and 1B is configured to be operable vertically, with the filter below the membrane element(s). In this way, feed gas that is directed into the vessel may simply rise from the filter to reach the membrane element(s).

Referring to the figures, apparatus 100 includes at least one filter element, 102, and at least one membrane element, 103, contained within a housing or vessel, 101. The housing 101 typically takes the form of a cylindrical shell equipped with two removable heads—104 and 105—one at each end of the vessel. In the drawing, the heads are shown to be flanged, and are typically connected to the shell by means of bolts (not shown), although any appropriate means of attachment that allows the heads to be easily removable from the vessel is intended to be within the scope of the invention. Although heads 104 and 105 are shown in FIG. 1 as being flat plates, other types of configurations, such as curved or arched heads, are within the scope of the invention.

Removable bottom head, 104, allows the filter element, 102, to be removed and replaced or cleaned; correspondingly, removable top head, 105, allows the membrane element(s), 103, to be removed and replaced or cleaned. This is an important feature of the invention.

The vessel or housing may be made of any convenient material. Housings are typically made of metal, conforming to appropriate codes for the operating conditions to which they are to be exposed. In the case that the feed gas is introduced at ambient pressure and 40° C., for example, a housing made from a plastic may suffice, so long as the material has adequate thermal conductivity. In the case that the feed is under high pressure or is very hot, a stainless or carbon steel housing, for example, may be needed. In general, metal housings are preferred.

Vessel or housing, 101, contains at least one filter element, 102. In the representative embodiment shown in FIGS. 1A and 1B, the filter, 102, is a simple coalescing filter, but any filter or set of filters adapted to capture entrained liquids from gases may be used. Filter elements for use in the membrane separation apparatus of the invention are widely known in the art and can be obtained from a variety of different manufacturers, including Peco (Mineral Wells, Tex.); Pall (Port Washington, N.Y.); Dollinger (Ocala, Fla.); and Jonell (Breckinridge, Tex.).

In the representative embodiment shown in the figures, the housing contains two membrane elements—a lower element 103a and an upper element 103b—arranged serially, so that residue gas from element 103a may ascend and enter as feed gas into element 103b. The membrane elements are usually sealed in gas-tight relationship against the inner walls of the housing, as is familiar to those of skill in the art, such that feed gas may not bypass the elements.

Membranes for use in the process of the invention will preferably comprise polymers that will preferentially permeate $C_{2+}$ hydrocarbons over methane (as described in the '965 patent), or that will preferentially permeate methane over $C_{2+}$ hydrocarbons (as described in the '106 application).

As described in the '965 patent, membranes that preferentially permeate $C_{3+}$ hydrocarbons over methane are preferably made from an elastomeric or rubbery polymer, examples of which include, but are not limited to, nitrile rubber, neoprene, polydimethylsiloxane (silicone rubber), chlorosulfonated polyethylene, polysilicone-carbonate copolymers, fluoroelastomers, etc. (further examples are provided within the disclosure of the '965 patent). Silicone rubber is the most preferred material for separating $C_{3+}$ hydrocarbons from methane.

As described in the '106 application, membranes that preferentially permeate methane over $C_{2+}$ hydrocarbons are preferably made from a glassy polymer, examples of which include, but are not limited to, polyamides, polyimides, polysulfones, polyvinyl alcohol, polypropylene oxide, cellulose derivatives, polyvinylidene fluoride, and polymers having repeating units of fluorinated dioxoles, fluorinated dioxolanes, and fluorinated cyclically polymerizable alkyl ethers. Particularly preferred membranes have selective layers made from a hydrophobic fluorinated glassy polymer or copolymer The membranes are typically composite membranes manufactured as flat sheets and housed in spiral-wound elements, although any membrane elements capable of being housed in the vessel and performing the appropriate separation may be used. Such membranes and elements/modules are well-known in the art and described copiously in the literature.

In addition to the filter element and membrane element(s), the apparatus, 100, typically includes the following basic components: feed nozzle or inlet, 106; float switch, 107; liquid outlet, 108 (typically a valve); mesh pad, 109; permeate pipe, 110; permeate nozzle or outlet, 111; and membrane residue nozzle or outlet, 112. All of the various valves, nozzles, and other components used in the apparatus are of the type known in the art of membrane module manufacture.

In operation, a gaseous feed stream flows into vessel, 101, through inlet/feed nozzle, 106. From inlet/feed nozzle, 106, the gaseous feed stream flows into filter chamber, 120, and through filter element, 102. Aerosolized droplets within the gas stream coalesce and fall from the filter to the bottom of the housing, where they form a body of collected liquid. When liquid builds up to a certain level at the bottom of the housing, an optional float switch, 107, triggers opening of a liquid outlet, 108, which is typically a valve (often referred to as a "dump valve") that opens to release the entrapped liquid. Alternatively, opening of the liquid outlet, 108, can be triggered either manually, or by other appropriate automatic/automated means.

Remaining gas then passes through an optional mesh pad, 109, as a feed stream to membrane elements, 103a and 103b. Mesh pad, 109, provides some additional filtration, in that it will trap vapors that are carried upward by the gas stream.

The membrane feed stream, which is typically at high pressure, flows into membrane chamber, 126, and across the feed surface of the membranes in the membrane vessels, 103a and 103b. The permeate side of the membranes is typically maintained at lower pressure to provide a driving force for transmembrane permeation. Permeating gas from membrane elements, 103a and 103b, passes through the membranes to permeate pipe, 110, whence it exits the apparatus through permeate outlet, 111. Residue gas from membrane elements, 103a and 103b, exits the apparatus through residue outlet, 112.

Alternative embodiments of the apparatus of the invention are shown in FIGS. 2A-6. The preferences and choices for the individual apparatus components for all figures are the same as described above for the embodiment shown in FIGS. 1A and 1B, unless otherwise noted.

Figure 2A:
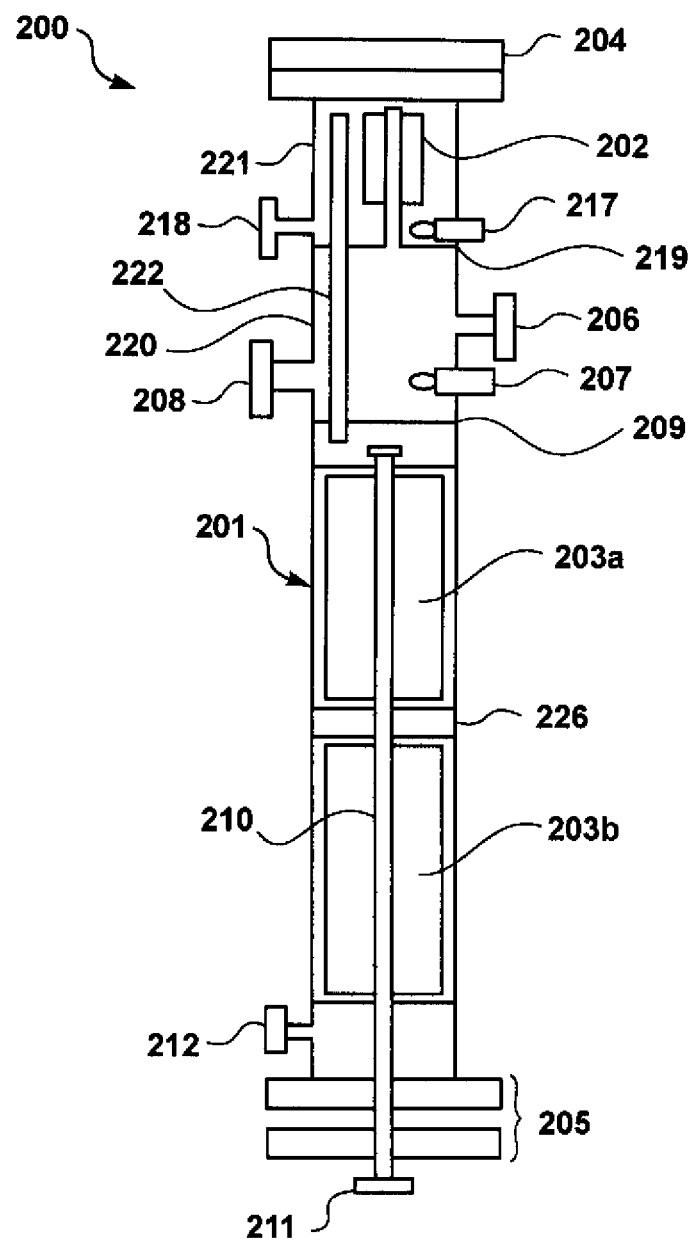
FIG. 2A is a cross-sectional view of a vertically oriented, two-stage filter/membrane separation apparatus in accordance with the invention.
Figure 2B:
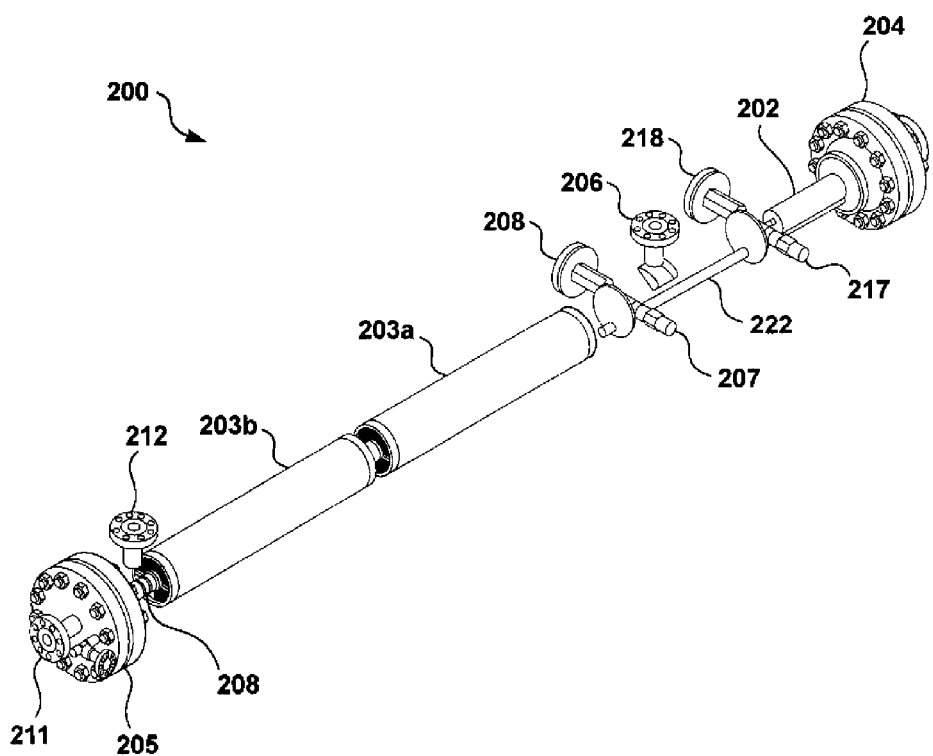
FIG. 2B is an exploded side view of the apparatus shown in FIG. 2A.

FIG. 2A is a cross-sectional view of a two-stage filter/membrane separation apparatus, 200, in accordance with the invention. FIG. 2B is an exploded side view of the apparatus 200 shown in FIG. 2A. The apparatus embodiment illustrated in FIGS. 2A and 2B is configured to be operable vertically, in this case, with the filter above the membrane element(s).

Like apparatus 100, shown in FIGS. 1A and 1B, apparatus 200 includes at least one filter element, 202, and at least one membrane element, 203, contained within a housing or vessel, 201. The housing, 201, typically takes the form of a cylindrical shell equipped with two removable heads—204 and 205—one at each end of the vessel. Removable top head, 204, allows the filter element, 202, to be removed and replaced or cleaned; correspondingly, removable bottom head, 205, allows the membrane element(s), 203, to be removed and replaced or cleaned.

This vessel, 201, includes two stages for liquids removal—a lower stage, 220, and an upper stage, 221—and is particularly suited to treating gas streams that are heavily contaminated with liquids or readily condensable vapors. In this vessel, the filter stages are positioned above the membrane separation elements, 203a and 203b, from which they are separated by a solid plate or wall, 209.

In addition to the elements described above, the apparatus, 200, typically includes the following basic components: feed nozzle or inlet, 206; first float switch, 207; first liquid outlet, 208; liquid-impermeable plates, 209 and 219; permeate pipe, 210; permeate nozzle or outlet, 211; residue nozzle or outlet, 212; second float switch, 217; second liquid outlet, 218; and internal tube, 222.

In operation, a gaseous feed stream flows into lower stage, 220, of vessel, 201, through inlet/feed nozzle, 206. The lower stage, 220, collects bulk liquids from gas entering the vessel, 201, by allowing the liquids to collect and run down the interior walls of the vessel and collect on plate, 209. When liquid builds up to a certain level on plate, 209, an optional first float switch, 207, triggers opening of first liquid outlet, 208 (which is typically a valve as described above), that opens to release the entrapped liquid. Alternatively, opening of first liquid outlet, 208, can be triggered either manually, or by other appropriate automatic/automated means.

Remaining gas—including aerosolized droplets or mist—flows up through the filter element, 202, installed on plate, 219, into the upper stage, 221. Any additional aerosol present in the gas flowing through the filter, 202, coalesces and collects as liquid in stage, 221. When liquid builds up to a certain level in upper stage, 221, an optional second float switch, 217, triggers opening of second liquid outlet, 218, which is also typically a valve that opens to release the entrapped liquid. Alternatively, opening of second liquid outlet, 218, can be triggered either manually, or by other appropriate automatic/automated means.

The remaining gas—now essentially devoid of liquids and substantially devoid of aerosols—passes into the internal tube, 222, whence it flows downward as a feed stream to membrane chamber, 226, which includes membrane elements, 203a and 203b. The membrane feed stream, which is typically at high pressure, flows across the feed surface of the membranes in the membrane vessels, 203a and 203b. The permeate side of the membrane(s) is typically maintained at lower pressure to provide a driving force for transmembrane permeation. Permeating gas from membrane elements, 203a and 203b, passes through the membranes to permeate pipe, 210, whence it exits the apparatus through permeate outlet, 211. Residue gas from the membrane elements, 203a and 203b, exits the apparatus through residue outlet, 212.

Figure 3:
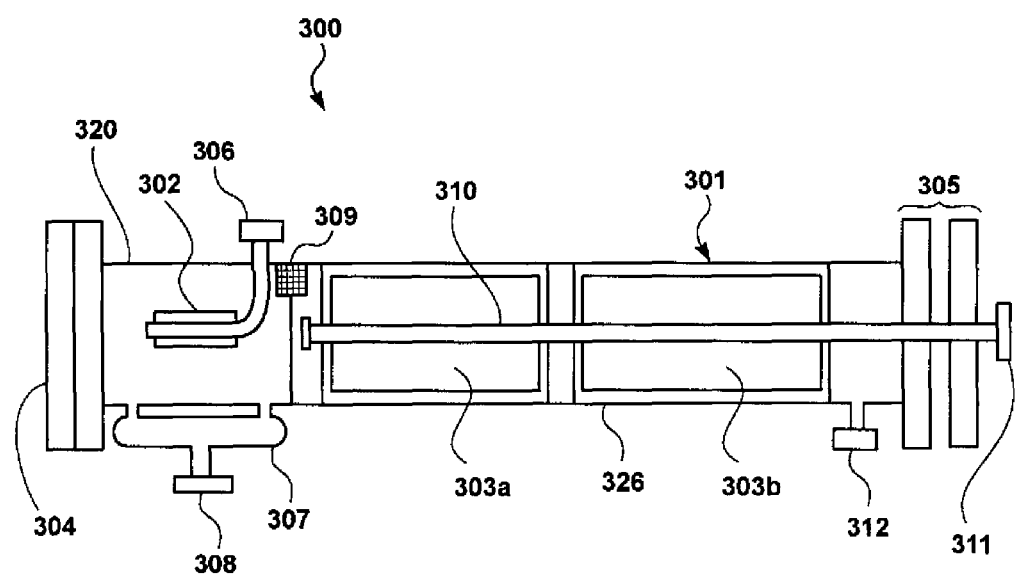
FIG. 3 is a cross-sectional view of a horizontally oriented, single-stage filter/membrane separation apparatus in accordance with the invention.

FIG. 3 is a cross-sectional view of an alternative embodiment of a single-stage filter/membrane separation apparatus 300—similar to the apparatus 100 shown in FIGS. 1A and 1B—except that apparatus, 300, is configured to be operated horizontally, rather than vertically. When there is a space limitation on the height of the apparatus, a horizontal configuration may be preferred.

Apparatus, 300, includes at least one filter element, 302, and at least one membrane element, 303, contained within a housing or vessel, 301. The housing, 301, typically takes the form of a cylindrical shell equipped with two removable heads—304 and 305—one at each end of the vessel. Removable first head, 304, allows the filter element, 302, to be removed and replaced or cleaned; correspondingly, removable second head, 305, allows the membrane element(s), 303, to be removed and replaced or cleaned.

In addition to the filter element and membrane element(s), the apparatus, 300, typically includes the following basic components: feed nozzle or inlet, 306; optional liquid reservoir, 307; liquid outlet, 308 (typically a valve); mesh pad, 309; permeate pipe, 310; permeate nozzle or outlet, 311; and residue nozzle or outlet, 312.

In operation, a gaseous feed stream flows into vessel, 301, through inlet/feed nozzle, 306. From inlet/feed nozzle, 306, the gaseous feed stream flows into filter chamber, 320, and through filter element, 302. Aerosolized droplets within the gas stream coalesce and fall from the filter into an optional liquid reservoir, 307, where they form a body of collected liquid. When liquid builds up to a certain level in reservoir, 307, an optional float switch (not shown) triggers opening of a liquid outlet, 308, which is typically a valve that opens to release the entrapped liquid from optional liquid reservoir, 307, or directly from chamber, 320. Alternatively, opening of the liquid outlet, 308, can be triggered either manually, or by other appropriate automatic/automated means.

Remaining gas then passes through an optional mesh pad, 309, as a feed stream to membrane chamber, 326, which includes membrane elements, 303a and 303b. Mesh pad, 309, provides some additional filtration, in that it will trap vapors that are carried upward by the gas stream.

The membrane feed stream, which is typically at high pressure, flows across the feed surface of the membranes in the membrane vessels, 303a and 303b. The permeate side of the membranes is typically maintained at lower pressure to provide a driving force for transmembrane permeation. Permeating gas from membrane elements, 303a and 303b, passes through the membranes to permeate pipe, 310, whence it exits the apparatus through permeate outlet, 311. Residue gas from the membrane elements exits the apparatus through residue outlet, 312.

Figure 4:
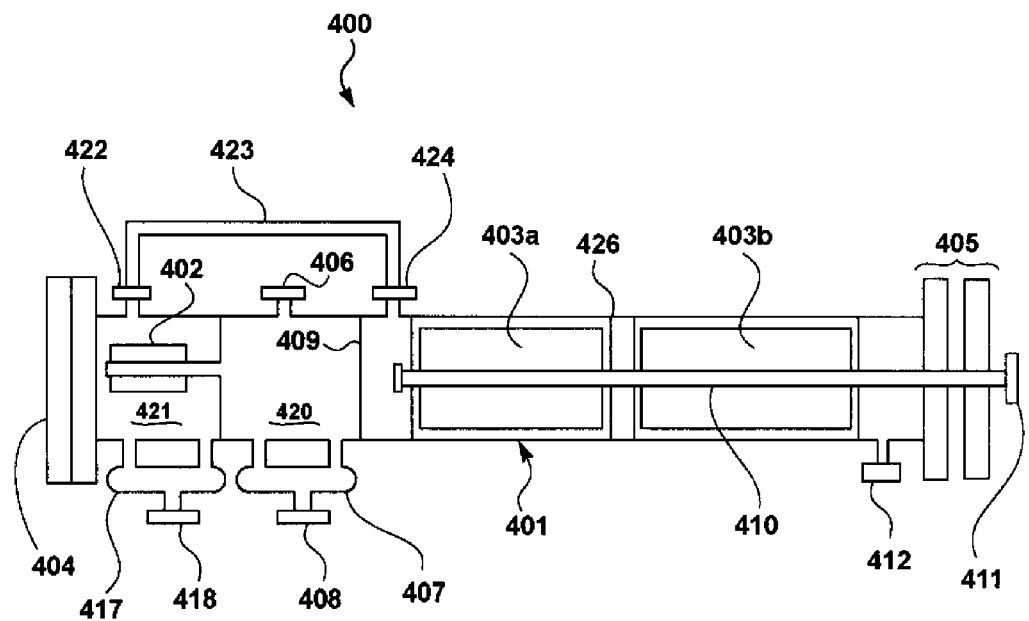
FIG. 4 is a cross-sectional view of a horizontally oriented, two-stage filter/membrane separation apparatus in accordance with the invention.

FIG. 4 is a cross-sectional view of an alternative embodiment of a two-stage filter/membrane separation apparatus—similar to the apparatus 200 shown in FIGS. 2A and 2B—except that apparatus 400 is configured to be operated horizontally, rather than vertically.

Apparatus, 400, includes at least one filter element, 402, and at least one membrane element, 403, contained within a housing or vessel, 401. The housing, 401, typically takes the form of a cylindrical shell equipped with two removable heads—404 and 405—one at each end of the vessel. Removable first head, 404, allows the filter element, 402, to be removed and replaced or cleaned; correspondingly, removable second head, 405, allows the membrane element(s), 403, to be removed and replaced or cleaned.

This vessel, 401, provides two stages for liquids removal—a first stage, 420, and a second stage, 421—and is particularly suited to treating gas streams that are heavily contaminated with liquids or readily condensable vapors.

In addition to the elements described above, the apparatus, 400, typically includes the following basic components: feed nozzle or inlet, 406; optional first liquid reservoir, 407; first liquid outlet, 408; liquid-impermeable plate, 409; permeate pipe, 410; permeate nozzle or outlet, 411; residue nozzle or outlet, 412; optional second liquid reservoir, 417; second liquid outlet, 418; second stage outlet, 422; external tube, 423; and membrane chamber inlet, 424.

In operation, a gaseous feed stream flows into first stage, 420, of vessel, 401, through inlet/feed nozzle, 406. The first stage, 420, collects bulk liquids from gas entering the vessel, 401, by allowing the liquids to collect and run down the interior walls of the vessel and collect in optional first liquid reservoir, 407. When liquid builds up to a certain level in first liquid reservoir, 407, an optional first float switch (not shown)

triggers opening of first liquid outlet, 408, which is typically a valve that opens to release the entrapped liquid from optional first liquid reservoir, 407, or directly from first chamber, 420. Alternatively, opening of first liquid outlet, 408, can be triggered either manually, or by other appropriate automatic/automated means.

Remaining gas—including aerosolized droplets or mist—flows into filter element, 402. Any additional aerosols present in the gas flowing through filter, 402, coalesces and collects as liquid in optional second liquid reservoir, 417. When liquid builds up to a certain level in second liquid reservoir, 417, an optional second float switch (not shown) triggers opening of second liquid outlet, 418, which is also typically a valve that opens to release the entrapped liquid from optional second liquid reservoir, 417, or directly from second chamber, 421. Alternatively, opening of second liquid outlet, 418, can be triggered either manually, or by other appropriate automatic/automated means.

The remaining gas—now essentially devoid of liquids and substantially devoid of aerosols—passes from the second stage, 421, through second stage outlet, 422, into external tube, 423, and from there through the membrane chamber inlet, 424, whence it flows as a feed stream to membrane chamber, 426, which includes membrane elements, 403a and 403b. The membrane feed stream, which is typically at high pressure, flows across the feed surface of the membranes in the membrane vessels, 403a and 403b. The permeate side of the membrane(s) is typically maintained at lower pressure to provide a driving force for transmembrane permeation. Permeating gas from membrane elements, 403a and 403b, passes through the membranes to permeate pipe, 410, whence it exits the apparatus through permeate outlet 411. Residue gas from the membrane elements, 403a and 403b, exits the apparatus through residue outlet, 412.

Alternatively, instead of an external tube connecting second stage chamber, 421, to membrane shell, 401, the same can be accomplished by an internal pipe connecting second stage chamber, 421 with membrane vessel, 401, as taught above with respect to the vertically oriented, two-stage filter/membrane separation apparatus embodiment depicted in FIG. 2.

Figure 5:
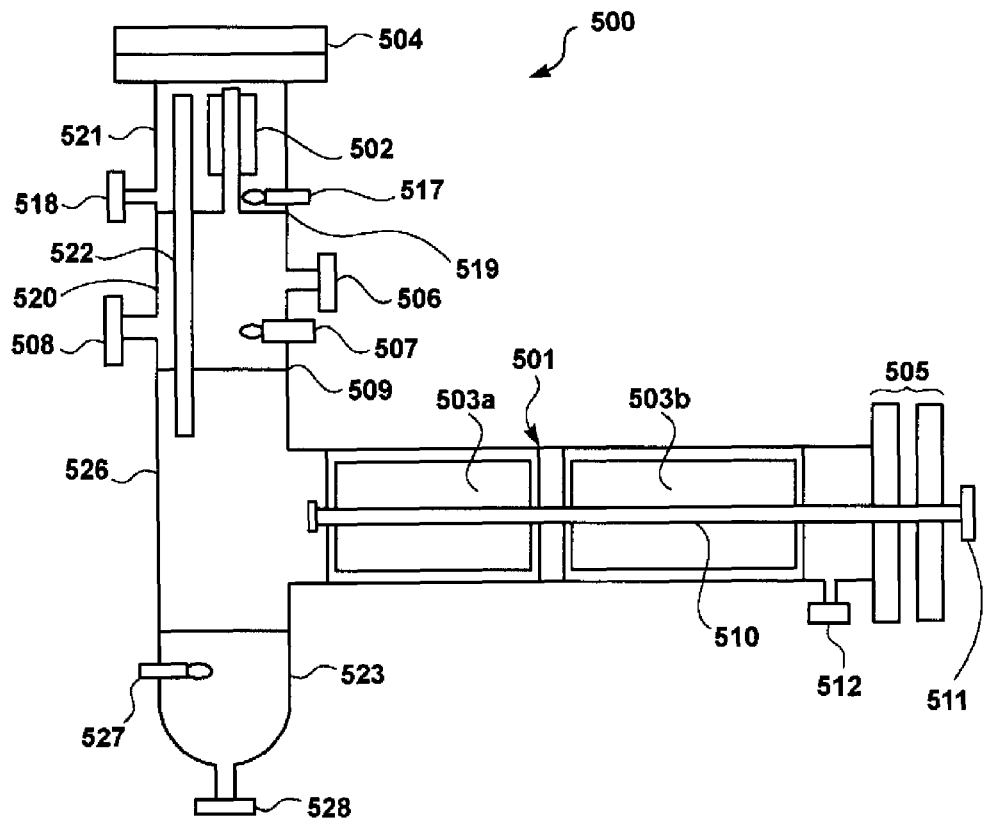
FIG. 5 is a cross-sectional view of an L-shaped, two-stage filter/membrane separation apparatus in accordance with the invention.

In an alternative embodiment, the apparatus may take on an L-shaped configuration. FIG. 5 shows one such design. This configuration is particularly beneficial in situations where three or more membrane elements are involved (for simplicity, only two are shown in FIG. 5) and, in particular, where height limitations are involved.

FIG. 5 is a cross-sectional view of an L-shaped, two-stage filter/membrane separation apparatus, 500, in accordance with the invention. The apparatus, 500, shown in FIG. 5 includes two stages for liquid removal, 520 and 521, with an optional third liquid removal stage, 523, and a membrane chamber, 526, which contains two membrane separation elements, 503a and 503b, all of which stages/chambers are contained within an L-shaped housing or vessel, 501.

The housing, 501, typically takes the form of a cylindrical shell equipped with two removable heads—504 and 505—one at each end of the vessel. Removable head, 504, allows the filter element, 502, to be removed and replaced or cleaned; correspondingly, removable head, 505, allows the membrane element(s), 503, to be removed and replaced or cleaned.

In addition to the elements described above, the apparatus, 500, typically includes the following basic components: feed nozzle or inlet, 506; first float switch, 507; first liquid outlet, 508; liquid-impermeable plates, 509 and 519; permeate pipe, 510; permeate nozzle or outlet, 511; residue nozzle or outlet, 512; second float switch, 517; second liquid outlet, 518; internal tube, 522; optional third float switch, 527; and optional third liquid outlet, 528.

In operation, a gaseous feed stream flows into first stage, 520, of vessel, 501, through inlet/feed nozzle, 506. First stage, 520, collects bulk liquids from gas entering the vessel, 501, by allowing the liquids to collect and run down the interior walls of the vessel and collect on plate, 509. When liquid builds up to a certain level on plate, 509, an optional first float switch, 507, triggers opening of first liquid outlet, 508 (which is typically a valve as described above), that opens to release the entrapped liquid. Alternatively, opening of first liquid outlet, 508, can be triggered either manually, or by other appropriate automatic/automated means.

Remaining gas—including aerosolized droplets or mist—flows up through filter element, 502, into second stage, 521. Any dditional aerosols present in the gas flowing through filter, 502, coalesces and collects as liquid in second stage, 521. When liquid builds up to a certain level in second stage, 521, an optional second float switch, 517, triggers opening of second liquid outlet, 518, which is also typically a valve that opens to release the entrapped liquid. Alternatively, opening of second liquid outlet, 518, can be triggered either manually, or by other appropriate automatic/automated means.

The remaining gas then passes into internal tube, 522, connecting second stage, 521, to membrane chamber, 526, whence it flows as a feed stream to membrane elements, 503a and 503b. The membrane feed stream, which is typically at high pressure, flows across the feed surface of the membranes in the membrane vessels, 503a and 503b. The permeate side of the membrane(s) is typically maintained at lower pressure to provide a driving force for transmembrane permeation. Permeating gas from membrane elements, 503a and 503b, passes through the membranes to permeate pipe, 510, whence it exits the apparatus through permeate outlet, 511. Residue gas from the membrane elements, 503a and 503b, exits the apparatus through residue outlet, 512.

The apparatus, 500, shown in FIG. 5 includes an optional third liquid removal stage, 523. Any additional liquid present in the gas can be withdrawn through third liquid outlet, 528, which is typically triggered by optional third float switch, 527, before the gas reaches membrane chamber, 526.

For shipping purposes, the filter stages, 520 and 521, and membrane chamber, 526, can be shipped as two portions, then assembled on-site. In an alternative embodiment, the membrane chamber, 526, can be the vertical portion, and the filter stages, 520 and 521, the horizontal portion.

Figure 6:
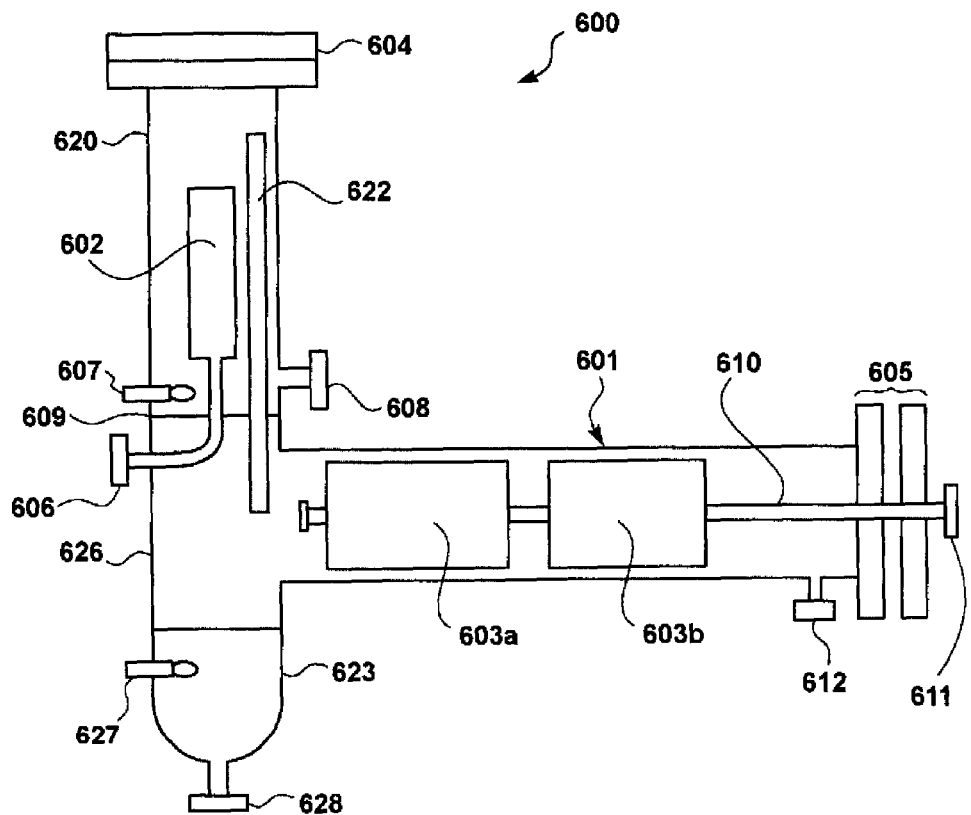
FIG. 6 is a cross-sectional view of an L-shaped, single-stage filter/membrane separation apparatus in accordance with the invention.

FIG. 6 is a cross-sectional view of an L-shaped, single-stage filter/membrane separation apparatus, 600, in accordance with the invention. The apparatus, 600, shown in FIG. 6 has one stage for liquid removal, 620, with an optional second liquid removal stage, 623, and a membrane chamber, 626, which contains two membrane separation elements, 603a and 603b, all of which stages/chambers are contained within an L-shaped housing or vessel, 601.

The housing, 601, typically takes the form of a cylindrical shell equipped with two removable heads—604 and 605—one at each end of the vessel. Removable head, 604, allows the filter element, 602, to be removed and replaced or cleaned; correspondingly, removable head, 605, allows the membrane element(s), 603, to be removed and replaced or cleaned.

In addition to the elements described above, the apparatus, 600, typically includes the following basic components: feed nozzle or inlet, 606; float switch, 607; liquid outlet, 608; liquid-impermeable plate, 609; permeate pipe, 610; permeate nozzle or outlet, 611; and residue nozzle or outlet, 612; internal tube, 622; optional second float switch, 627; and optional second liquid outlet, 628.

In operation, a gaseous feed stream flows into stage, 620, of vessel, 601, through inlet/feed nozzle, 606. Stage, 620, comprises a filter, 602, in which any aerosolized droplets coalesce and are collected as liquids on plate, 609. When liquid builds up to a certain level on plate, 609, an optional first float switch, 607, triggers opening of liquid outlet, 608 (which is typically a valve as described above), that opens to release the entrapped liquid. Alternatively, opening of first liquid outlet, 608, can be triggered either manually, or by other appropriate automatic/automated means.

The remaining gas then passes into internal tube, 622, which connects stage, 620, to membrane chamber, 626, whence it flows as a feed stream to membrane elements, 603a and 603b. The membrane feed stream, which is typically at high pressure, flows across the feed surface of the membranes in the membrane vessels, 603a and 603b. The permeate side of the membrane(s) is typically maintained at lower pressure to provide a driving force for transmembrane permeation. Permeating gas from membrane elements, 603a and 603b, passes through the membranes to permeate pipe, 610, whence it exits the apparatus through permeate outlet, 611. Residue gas from the membrane elements, 603a and 603b, exits the apparatus through residue outlet, 612.

The apparatus, 600, shown in FIG. 6 includes an optional second liquid removal stage, 623. Any additional liquid present in the gas can be withdrawn through second liquid outlet, 628, which is typically triggered by optional second float switch, 627, before the gas reaches membrane chamber, 626.

In summary, in its most basic form, the invention is a membrane separation apparatus in which the filter element and membrane element(s) are housed within a common vessel, and where internal components of the vessel are configured in such a manner as to allow liquids to be trapped and removed from the vessel, and gases to flow to and through the membrane elements.

Applicants have described and illustrated various specific embodiments of the subject invention, from which those of skill in the art will be able to devise other variants without departing from the scope of the invention.

I claim:

1. A gas separation apparatus comprising,
    A vessel housing at least the following components:
    (i) a filter element,
    (ii) a membrane module containing a gas separation membrane selective between methane and other gases; the membrane module having a feed side and a permeate side
    wherein the vessel includes:
    (i) a feed inlet in fluid communication with the filter element,
    (ii) at least one liquid outlet,
    (iii) means for allowing access to the filter element,
    (iv) means for extracting a residue stream from the feed side,
    (v) means for extracting a permeate stream from the permeate side,
    (vi) means for allowing access to the membrane module, and
    (vii) means for directing a filtered gas stream to the feed side.

2. A gas separation apparatus in accordance with claim 1, wherein the membrane module is a spiral-wound module.

3. A gas separation apparatus in accordance with claim 1, wherein the means for allowing access to the filter element is a removable head or flange.

4. A gas separation apparatus in accordance with Claim 1, wherein the means for extracting the residue stream from the feed side is a residue outlet or valve.

5. A gas separation apparatus in accordance with claim 1, wherein the means for extracting the permeate stream from the permeate side is a permeate outlet or valve.

6. A gas separation apparatus in accordance with claim 5, wherein the apparatus further includes a permeate pipe that runs the length of the membrane module and is in fluid communication with the permeate outlet or valve.

7. A gas separation apparatus in accordance with claim 1, wherein the means for allowing access to the membrane module is a removable head or flange.

8. A gas separation apparatus in accordance with claim 1, wherein the vessel houses one membrane module.

9. A gas separation apparatus in accordance with claim 1, wherein the vessel houses multiple membrane modules.

10. A gas separation apparatus in accordance with claim 1, wherein the apparatus is adapted to be operable in a substantially vertical orientation, such that the vessel has a top and a bottom.

11. A gas separation apparatus in accordance with claim 10, wherein the filter element is below the membrane module, and the liquid outlet is proximate to the bottom of the vessel.

12. A gas separation apparatus in accordance with claim 10, wherein the filter element is above the membrane module, and the liquid outlet is proximate to the top of the vessel.

13. A gas separation apparatus in accordance with claim 12, wherein the apparatus is adapted to remove liquids in two stages from a gaseous feed stream.

14. A gas separation apparatus in accordance with claim 1, wherein the apparatus is adapted to be operable in a substantially horizontal orientation.

15. A gas separation apparatus in accordance with claim 14, wherein the apparatus is adapted to remove liquids in two stages from a gaseous feed stream.

16. A gas separation apparatus in accordance with claim 1, wherein the apparatus has an L-shaped configuration.

17. A gas separation apparatus in accordance with claim 16, wherein the vessel houses three or more membrane modules.

18. A gas separation apparatus in accordance with claim 1, wherein the apparatus is a fuel gas conditioning unit.

19. A gas separation apparatus in accordance with claim 18, wherein the membrane module contains gas separation membranes that are preferentially permeable to methane over $C_{2+}$ hydrocarbons.

20. A gas separation apparatus in accordance with claim 18, wherein the membrane module contains gas separation membranes that are preferentially permeable to $C_{2+}$ hydrocarbons over methane.

* * * * *